April 16, 1963   L. R. ASHMEAD   3,085,659
CUSHIONED RETARDER
Filed March 21, 1961   3 Sheets-Sheet 1
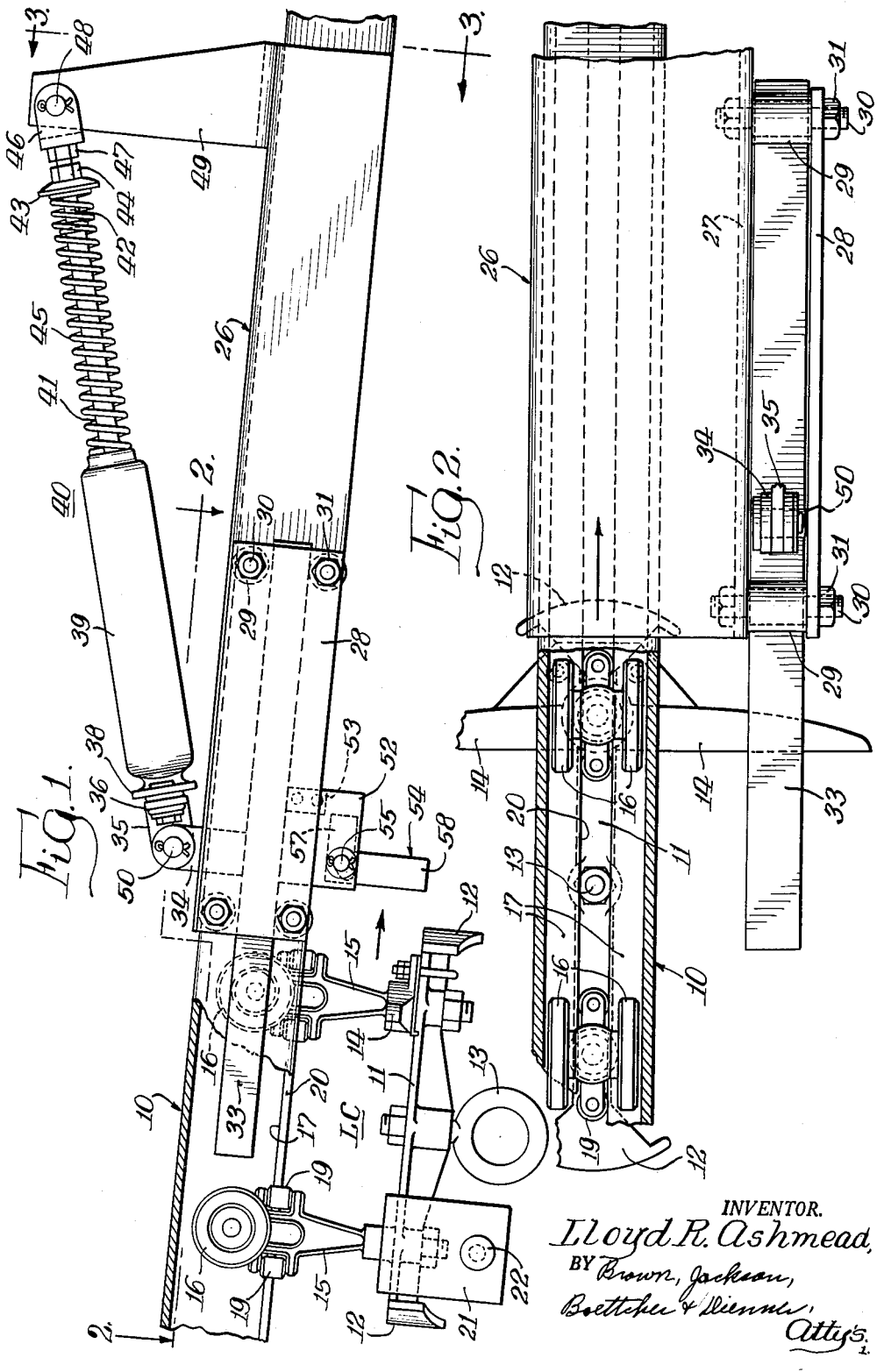
INVENTOR.
Lloyd R. Ashmead,
BY Brown, Jackson,
Boettcher & Dienner,
Attys.

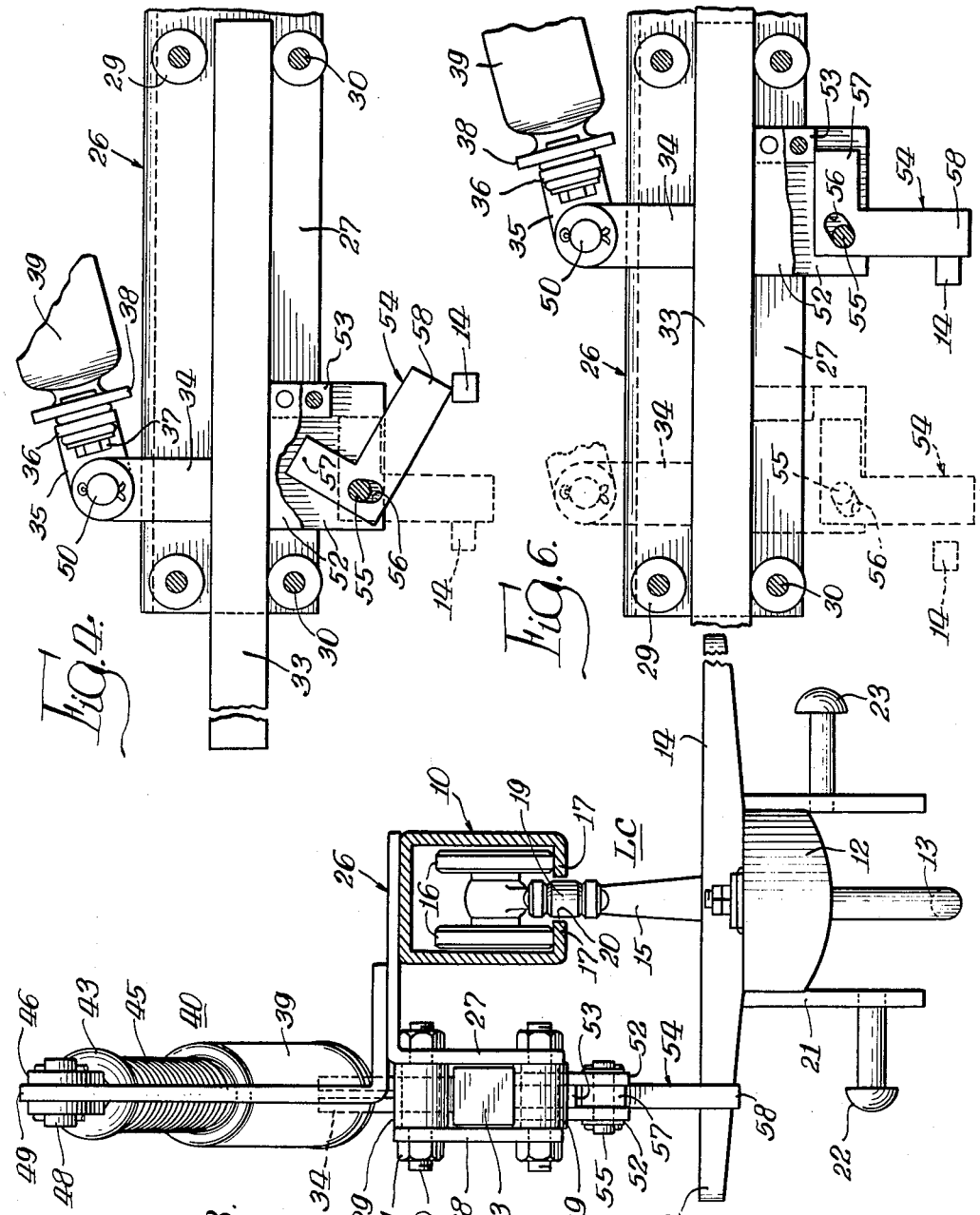

April 16, 1963 L. R. ASHMEAD 3,085,659
CUSHIONED RETARDER
Filed March 21, 1961 3 Sheets-Sheet 3
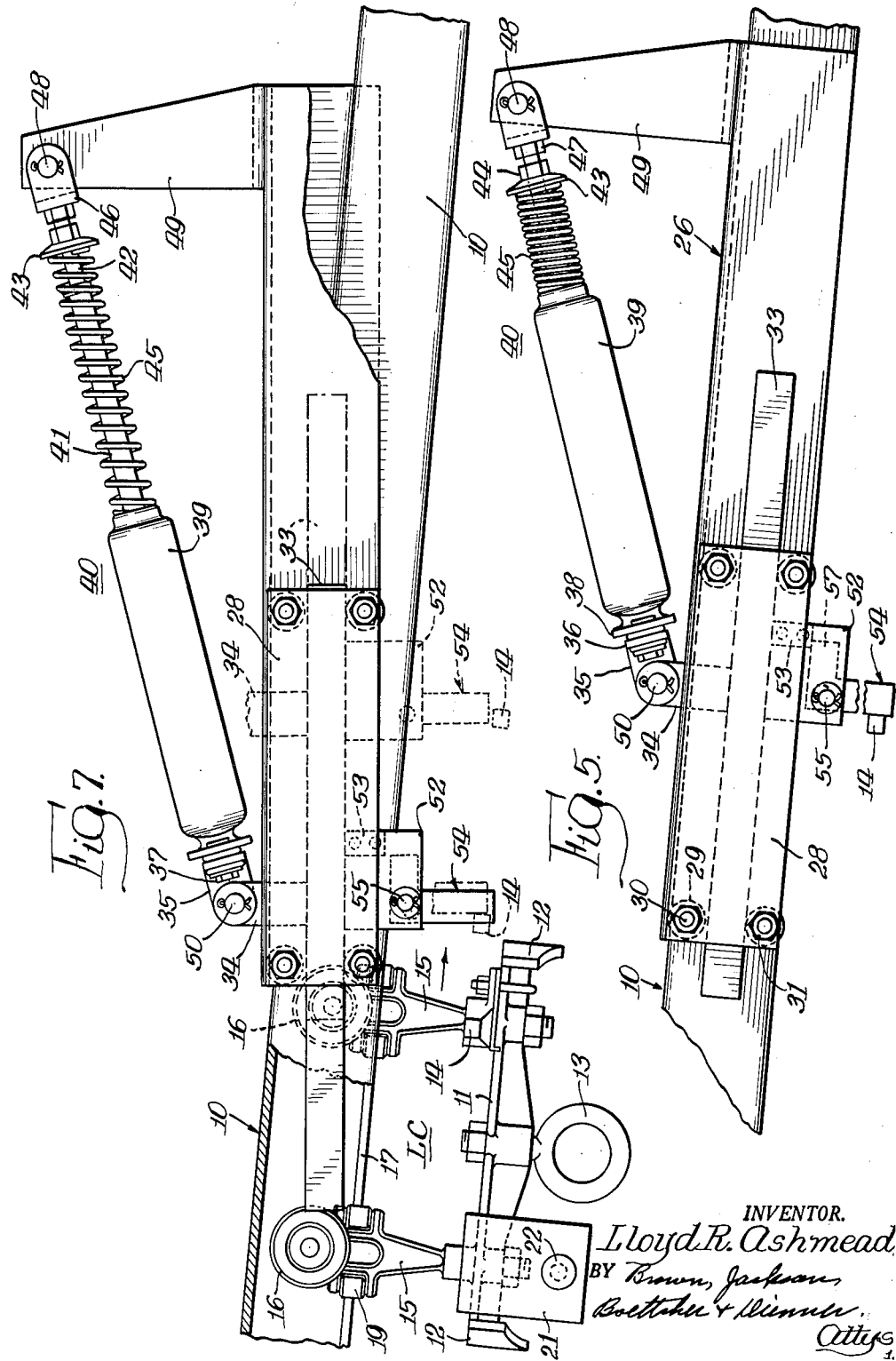
INVENTOR.
Lloyd R. Ashmead
BY Brown, Jackson,
Boettcher & Dienner
Attys

United States Patent Office 3,085,659
Patented Apr. 16, 1963

3,085,659
CUSHIONED RETARDER
Lloyd R. Ashmead, Pittsford, N.Y., assignor, by mesne assignments, to Richards-Wilcox Manufacturing Company, Aurora, Ill., a corporation of Illinois
Filed Mar. 21, 1961, Ser. No. 97,215
7 Claims. (Cl. 188—42)

This invention relates to means for retarding travel of load carriers or trolleys down inclined tracks used in overhead conveyor systems and analogous installations.

It is known to provide in factories and shops conveyor systems for transporting articles in course of manufacture from one location to another for various operations, such systems including inclined storage tracks for uncompleted articles such, for example, as articles which have been painted and it is desired to hold in storage until the paint has dried pending possible further operations. The storage tracks are inclined from an entrance end downward to an exit end, suitable means being provided for delivering the articles to and releasing them from the storage tracks. The articles are carried by wheeled carriers or trolleys travelling on the tracks of the conveyor system, the trolleys travelling freely by gravity downward along the inclined storage tracks. It is important to guard against excessive speed of travel of the loaded trolleys down the storage tracks with resultant violent bumping or striking of the articles one against the other causing damage to or breakage of such articles. It is also important that a loaded trolley travelling at excessive speed be not stopped abruptly so as to cause violent swinging of the articles suspended therefrom with possible damage to such articles or other articles on adjacent trolleys on the same storage track.

My invention is directed to means for retarding travel of a trolley down an inclined track at excessive speed without abruptly stopping the trolley. To that end I provide a retarder comprising cushioning means such that the speed of travel of the trolley is reduced to a safe or desirable rate without causing abrupt or violent stoppage of the trolley, after which travel of the trolley at a reduced speed may be resumed. The retarder of my invention is particularly suitable for use in conveyor systems of the character above mentioned, but may also be used for any purpose to which it is suited, as will be understood. Further objects and advantages of my invention will appear from the detail description.

In the drawings:

FIGURE 1 is a side view of a retarder embodying my invention mounted on an inclined track on which a wheeled trolley travels, the track being partly broken away and shown in section with a trolley thereon shown in elevation;

FIGURE 2 is a sectional view taken substantially on line 2—2 of FIGURE 1;

FIGURE 3 is a sectional view, on an enlarged scale, taken substantially on line 3—3 of FIGURE 1;

FIGURE 4 is a fragmentary lengthwise sectional view of the retarder, the arm only of the trolley being shown, this view showing only the latch end portion of the retarder and the side plate of the latch carriage being partly broken away;

FIGURE 5 is a view similar to FIGURE 1 but with the trolley arm contacting the latch and the spring of the retarder under compression, the arm only of the trolley being shown and the track being shown in elevation;

FIGURE 6 is a view similar to FIGURE 4 but showing a somewhat different mode of operation of the retarder; and FIGURE 7 is a view similar to FIGURE 1 but with the track inclined relative to the retarder and showing a further mode of operation of the retarder.

In the accompanying drawings I have shown the retarder of my invention as applied, by way of example, to an inclined track 10, such as a storage track above referred to, down which load carriers LC travel by gravity in the direction indicated by the arrow. The load carrier LC or trolley as it frequently is termed, is preferably of the construction shown, but may be of any suitable type. It comprises a load bar 11 provided with end bumpers 12 and having at its midlength an eye bolt 13 from which a work piece or load (not shown) is suspended in a suitable manner. A cross bar, providing arms 14, is secured on load bar 11 at the leading end thereof. The load bar 11 is supported by end hangers or trucks 15 each carrying two wheels 16 travelling upon the upper surfaces of inwardly extending flanges 17 at the bottom or under side of track 10 of substantially box form in cross section. The trucks 15 are further provided with vertically disposed rollers 19 extending through the space or slot 20 between flanges 17, effective for preventing objectionable side sway of the trolley and for assisting in guiding it about curves or turns in the track. A stirrup member 21 of inverted U-shape is secured to load bar 11 adjacent the following end thereof. Selector pins 22 and 23 are suitably mounted in the arms of the stirrup member 21 and disposed to actuate electrical control switches in a system of the character above mentioned. In such conveyor systems the trolleys are conveyed along a load track by means of a pusher chain having dogs disposed to contact the arms 14 and may be diverted from the load track onto a storage track and delivered from the latter to the work track, by means of feed-in and escapement track switches operated responsive to electrical control switches actuated by the selector pins 22 and 23, as is known. A trolley entering a storage track travels downward by gravity along the latter until it is stopped by contact with a preceding trolley on that track, or by hold-back or stop means of the track escapement switch means at the exit end of the storage track, as is known.

The retarder of my invention is mounted on the inclined storage track 10 by means of an angle bracket 26 one arm of which is welded to the top of track 10. The other arm 27 of bracket 26 provides a vertically disposed side plate to which is secured, in parallel spaced relation, a second side plate 28, by means of shouldered bolts 29 having at each end a reduced screw stud 30 on which a nut 31 is threaded, the plates 27 and 28 being clamped in position between the nuts and the shoulders of the bolts 29.

A bar 33 of rectangular cross section is slidably mounted between the plates 27 and 28 and the shouldered or body portions of the bolts with a snug, but not tight, fit therebetween. A finger 34, slotted from its upper end, is suitably secured, conveniently by welding, to the upper face of bar 33 at about the midlength thereof and extends therefrom upwardly between and above the side plates 27 and 28. The finger 34 receives, in its upper end, finger 35 of a T-shaped fitting 36 the base of which is secured, by screw studs 37, to base 38 of cylinder 39 of a shock absorber 40 of known type. The shock absorber 40 further includes a piston rod 41 having at one end a piston (not shown) operating in cylinder 40. The rod 41 is provided at its other end with a reduced screw stud 42 receiving a concavo-convex spring seat member 43 restrained against outward movement along stud 42 by a stop nut 44 threaded on the latter. A compression spring 45 is disposed about rod 41 and confined between seat member 43 and the upper end of cylinder 40. A shackle 46 is threaded on the upper end of stud 42 and is locked in position thereon by a jam nut 47. The shackle 46 is pivoted, by a pin 48 to the upper end of an angle bracket 49 welded to and extending upward from the mounting bracket 26. Similarly, the finger 35 of T- fitting 36 is pivoted in finger 34 by a pin 50 restrained against endwise movement by cotter pins inserted through the ends thereof, as is the pin 48. The mounting bracket 26 is disposed parallel with the track 10, as shown in FIGURES 1 and 5 of the drawings.

A latch carriage comprising two rectangular plates 52 with a spacing block 53 riveted between them, is secured, conveniently by welding, to the underface of bar 33 about the midlength thereof. The latch carrier projects downward beyond plates 27 and 28 and is provided with a latch member 54 of substantially inverted L-shape pivotally and slidably mounted between the plates 52, by means of a pivot pin 55 extending through plates 52 and through an inclined slot 56 at the juncture of the arms 57 and 58 of latch member 54. The spacer block 53, which also serves as a stop for arm 57 of latch member 54 under certain conditions, as will appear more fully presently, is disposed at the upper inner corner of the latch carriage and the pivot pin 55, restrained against endwise movement by cotter pins inserted through the ends thereof, is disposed adjacent the diagonally opposite corner of the latch carriage. The compression spring 45 normally is under but slight compression effective for holding the bar 33 in its projected position shown in FIGURE 1 with the latch carriage in its normal position there shown. Arm 58 of latch member 54 is of substantially greater length and weight than arm 57 thereof effective for normally holding the latch member 54 in its position shown in FIGURE 1, with pin 55 at the upper end of slot 56 and arm 58 depending vertically from the pin 55. The retarder is so disposed that arm 58 of latch member 54 normally is in the path of travel of an arm 14 of a trolley LC passing downwardly along the track 10. If the trolley is travelling at a speed which is not excessive, arm 14 will contact arm 58 of latch member 54 and will turn the latter in counterclockwise direction about the pivot pin 55 without causing the latch member 54 to move upwardly over pin 55. During such turning movement of the latch member 54 arm 57 thereof clears the stop block 53, appropriately disposed to that end, and arm 14 of the trolley then passes beneath and beyond the latch arm 58, the trolley continuing its travel uninterruptedly down the track 10, as shown in FIGURE 4. If the trolley is travelling at excessive speed when it reaches the retarder, the impact of arm 14 of the trolley with arm 58 of the latch member causes the latter to move upward and inward over pin 55 so as to dispose arm 57 beneath block 53 in contact therewith. The latch member is then locked against turning movement and in the continued travel of the trolley bar 33 is moved inward between the plates 27 and 28 with corresponding movement of cylinder 39 toward bracket 49 effective for placing the spring 45 under increasing compression and thereby gradually slowing down and stopping the trolley with a cushioning effect, as shown in FIGURES 5 and 6. In FIGURE 5 the parts of the retarder are shown in the positions which they occupy when the trolley has been stopped and spring 45 is compressed. When the trolley has been stopped, the spring 45 will expand, the energy stored in spring 45 by compression thereof being sufficient to return the bar 33 and the latch member to normal positions. That causes movement of the trolley in reverse direction, i.e., upward, along the track 10, a short distance beyond the arm 58 of the latch member, due to inertia of the trolley, in such reverse direction, as indicated in broken lines in FIGURE 6. The trolley will then resume its downward travel along track 10 under substantially reduced speed such that arm 14 of the trolley will turn the latch member and will pass therebeneath in the same manner as if the trolley were traveling down the track toward the retarder at permissible speed, as in FIGURE 4. It will be seen that the retarder of my invention is effective for slowing down and stopping trolleys, with a cushioning action, if the trolleys approaching the retarder are travelling at excessive speed, and then permitting resumption of travel of the trolleys at permissible speed, but will not interfere with travel of trolleys along the track at permissible speed. In connection with the brief stopping of a trolley approaching the retarder at excessive speed, the entrance of trolleys or carriers onto the storage track 10 from the load track is controlled by a feed-in or entrance switch, in conveyor systems of the character above mentioned, and there is no objection to such brief stoppage of the trolley on the track 10 as may occur under the conditions mentioned.

In FIGURE 7 the track 10 is inclined relative to the retarder. If the trolley is travelling at excessive speed the latch member 54 will be locked against turning movement, as before. Should the speed of travel of the trolley be considerably in excess of the permissible speed, the spring 45 may be compressed to an extent sufficient to reduce the speed of travel of the pallet to less than the permissible speed and arm 14 may then pass beneath latch member 54, due to the inclination of track 10, as indicated in broken lines. In such case, the speed of travel of the pallet is reduced to less than the permissible speed and the pallet then resumes its travel without having been stopped. If the pallet approaching the retarder is travelling at a lesser speed in excess of the permissible speed, the trolley will be stopped and moved in reverse direction along track 10, and will then resume its travel downward along track 10, in the same manner as in FIGURE 6.

It will be understood that changes in detail may be resorted to without departing from the field and scope of my invention, and I intend to include all such variations, as fall within the scope of the appended claims, in this application in which the preferred form only of my invention has been disclosed.

I claim:

1. In trolley retarding means, an inclined trolley track and a trolley mounted on said track for gravity travel downward therealong, a latch member disposed for contact by a trolley travelling along said track, means mounting said latch member for displacement out of the path of travel of the trolley by contact with said member of said trolley when the latter is travelling at a speed within a predetermined limit and for precluding such displacement of said member when the trolley is travelling at a speed in excess of said limit, said track diverging downward from said latch member and the latter being mounted for movement lengthwise of said track in the direction of travel of said trolley, and means yieldingly accommodating movement of said latch member lengthwise of said track under impact of a trolley travelling down said track at excessive speed and to an extent enabling said trolley to clear said latch member and continue its travel downward along said track.

2. In trolley retarding means, a support comprising spaced substantially parallel mounting plates, shouldered bolts securing said plates together in substantially parallel spaced relation, a bar slidably mounted between said bolts and plates for movement lengthwise of the latter, a latch carriage fixed to said bar for movement therewith, a latch member pivotally and slidably mounted on said carriage and having an arm extending downward beyond said carriage, said latch member having a first position in which it is free for turning movement about its pivot axis and a second position to which it is moved by sliding movement transversely of its pivot axis, means on said carriage cooperating with said latch member for locking it against turning movement when said latch member is in its said second position, and yielding means normally holding said bar in an outer position on said support and yieldingly resisting movement of said bar inward of said support.

3. In trolley retarding means, a support comprising spaced substantially parallel mounting plates, shouldered bolts securing said plates together in substantially parallel spaced relation, a bar slidably mounted between said bolts and plates for movement lengthwise of the latter, a latch carriage fixed to said bar for movement therewith, a latch member pivotally and slidably mounted on said carriage and having an arm extending downward beyond said carriage, said latch member having a first position in which it is free for turning movement about its pivot axis and a second position to which it is moved by sliding movement transversely of its pivot axis, means on said carriage cooperating with said latch member for locking it against turning movement when said latch member is in its said second position, a finger fixed to said bar extending therefrom upward between and beyond said plates, a bracket fixed to one of said plates spaced a substantial distance lengthwise thereof from said finger, and shock absorbing means connecting said finger and bracket normally holding said bar in an outer position on said support and yieldingly resisting movement of said bar inward of said support.

4. In trolley retarding means, an inclined trolley track and a trolley mounted on said track for gravity travel downward therealong, a latch member having a normal position lengthwise of said track, said member comprising a trolley holding arm disposed for contact by a trolley travelling along said track in said normal position of said member, means mounting said member for displacement of said arm clear of said trolley by contact of the latter with said arm, when the trolley is travelling within a predetermined speed limit, and for precluding said displacement of said arm and moving said member lengthwise of said track divergent thereto by contact of the trolley with said arm, when the trolley is travelling at a speed in excess of said predetermined limit, and yielding means normally holding said latch member in its said normal position and presenting increasing resistance to movement thereof in the direction of travel of said trolley, movement of said latch means from its normal position lengthwise of said track to predetermined extent disposing said trolley holding arm clear of the trolley for continued travel thereof along said track.

5. In trolley retarding means, an inclined trolley track and a trolley mounted on said track for gravity travel downward therealong, a substantially horizontal support above said track, a bar substantially parallel with said support slidably mounted thereon for movement lengthwise of said track, a latch carriage fixed to said bar for movement therewith, a latch member depending from said carriage pivotally and slidably mounted thereon and having a downwardly extending trolley holding arm, said bar having a normal projected position and said arm being disposed in a first position for contact by the trolley and displaceable thereby about the pivot axis of said latch member clear of the trolley when the latter is travelling at permissible speed and said bar is in its said projected position, said latch member being slidable to a second position by contact with said arm of a trolley travelling down said track at excessive speed, means locking said latch member against displacement about its pivot axis when it is in its said second position, and yielding means normally holding said bar projected and presenting increasing resistance to movement thereof toward retracted position, movement of said bar to predetermined extent in retracting direction disposing said trolley holding arm clear of the trolley for continued travel thereof along said track.

6. In trolley retarding means for overhead trolley systems, an inclined trolley track and a trolley mounted thereon for gravity travel downward therealong, a latch carriage mounted for movement lengthwise of said track from its normal position of rest to a position in the direction of movement of an approaching trolley and back to position of rest, yielding means normally holding said latch carriage in said normal position and resisting movement thereof lengthwise of said track in the direction of movement of the trolley and returning the latch carriage to said normal position, a latch member mounted on said latch carriage and having a first position thereon and including an arm extending downward into the path of travel of the trolley, said latch member normally being in its said first position and free for displacement out of the path of travel of the trolley by contact with an arm of a trolley traveling at a speed within a predetermined limit, said latch member being movable to a second position by contact with said arm of a trolley traveling at a speed in excess of said limit, means effective for locking said latch member in its said second position against said free displacement thereof, said latch carriage in the second position of said latch member being automatically moved to said second position in the direction of movement of said last named trolley by momentum of said just named trolley whereupon the yielding means automatically arrests the movement of the latch carriage and the last referred to trolley and returns in a reverse direction the latch carriage along with said motion arrested trolley to said normal position of rest of said latch carriage whence said latch member automatically moves in its first position free for displacement under the influence of said motion arrested trolley resuming its movement down its inclined track and said just mentioned arrested trolley with its arm automatically moves therepast said latch member and continues its movement down said inclined track.

7. In trolley retarding means for overhead trolley systems, an inclined trolley track and a trolley mounted thereon for gravity travel downward therealong, a latch means mounted for movement lengthwise of said track from its normal position of rest to a position in the direction of movement of an approaching trolley and back to position of rest, yielding means normally holding said latch means in said normal position and resisting movement thereof lengthwise of said track in the direction of movement of the trolley and returning the latch means in said normal position, said latch means including a latch member having a first position and said latch member including an arm extending into the path of travel of the trolley, said latch member normally being in its said first position and free for displacement out of the path of travel of the trolley by contact with a trolley traveling at a speed within a predetermined limit, said latch member being movable to a second position by contact of its arm with said trolley traveling at a speed in excess of said limit, means effective for locking said latch member in its second position against said free displacement thereof, said latch means in the second position of said latch member being automatically moved to said second position in the direction of movement of said last named trolley by momentum of said just named trolley whereupon the yielding means automatically arrests the movement of the latch means and the last referred to trolley and returns in a reverse direction the latch means along with said motion arrested trolley to said normal position of rest of said latch means whence said latch member automatically moves in its first position free for displacement under the influence of said motion arrested trolley resuming its movement down its inclined track and said just mentioned arrested trolley automatically moves therepast said latch member and continues its movement down said inclined track.

References Cited in the file of this patent

FOREIGN PATENTS

| 904,731 | France | Mar. 19, 1945 |
| 237,031 | Germany | July 18, 1911 |